United States Patent [19]

Morse

[11] 4,438,300
[45] Mar. 20, 1984

[54] PROTECTIVE COVER FOR TELEPHONE PUSH BUTTON ARRAY

[75] Inventor: Milton Morse, Fort Lee, N.J.

[73] Assignee: APM Corporation, Englewood, N.J.

[21] Appl. No.: 236,757

[22] Filed: Feb. 23, 1981

[51] Int. Cl.³ .............................................. H04M 1/23
[52] U.S. Cl. ................................ 179/184; 179/90 K; 179/178; 200/302.1
[58] Field of Search ............. 179/178, 184, 186, 90 K; 200/302, 340

[56] References Cited

U.S. PATENT DOCUMENTS

| | | | |
|---|---|---|---|
| 1,600,603 | 9/1926 | Schwegler | 250/465.1 |
| 3,372,246 | 3/1968 | Knuepfer | 200/302 |
| 3,491,221 | 1/1970 | Zamarra | 179/184 |
| 3,749,870 | 7/1973 | Oakes | 200/302 |
| 4,078,257 | 3/1978 | Bagley | 340/365 S |
| 4,160,136 | 7/1979 | McGough | 179/184 |
| 4,293,764 | 10/1981 | Amrheim | 200/340 |

FOREIGN PATENT DOCUMENTS 195677 4/1965 Sweden ............................... 200/302

OTHER PUBLICATIONS

"Teleseel", *Telephony*, May 3, 1982, p. 100.

"Telephone Cover", *Telephony*, Nov. 3, 1980, p. 44.

Primary Examiner—G. Z. Rubinson
Assistant Examiner—L. C. Schroeder
Attorney, Agent, or Firm—Weingram & Klauber

[57] ABSTRACT

A protective cover is disclosed for the push button array of a push button dial telephone set. The cover comprises a flexible elastomeric sheet having a grid of upwardly-directed pockets, the lower-facing ends of which are open for snugly receiving and thereby overlying the corresponding array of push buttons on said telephone set. The pockets are elastically depressible independently of one another toward their open ends to permit individual displacement of the underlying telephone set push buttons received in the pockets. The sheet includes a skirt portion extending laterally beyond the grid and the sheet is continuous between its lateral edges whereby the entire push button array is overlaid by the cover and thereby protected against spilled liquids or other environmental hazards. The outwardly facing parts of the pocket portions carry readable indicia thereupon corresponding to the indicia on the underlying push buttons. The indicia can be defined by a phosphorescent material, whereby the indicia are visible under low light or darkened conditions.

6 Claims, 9 Drawing Figures

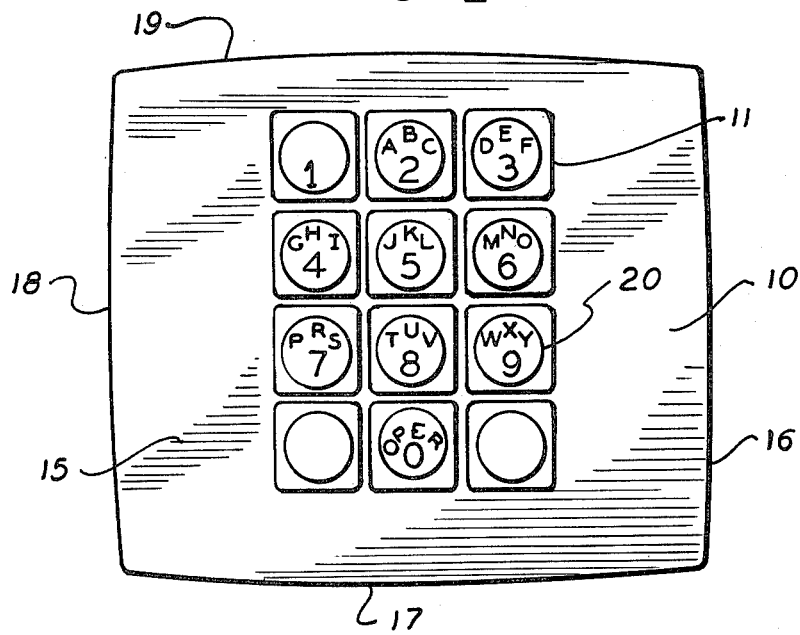
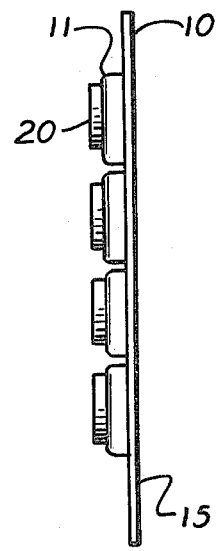
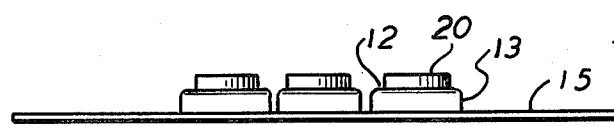
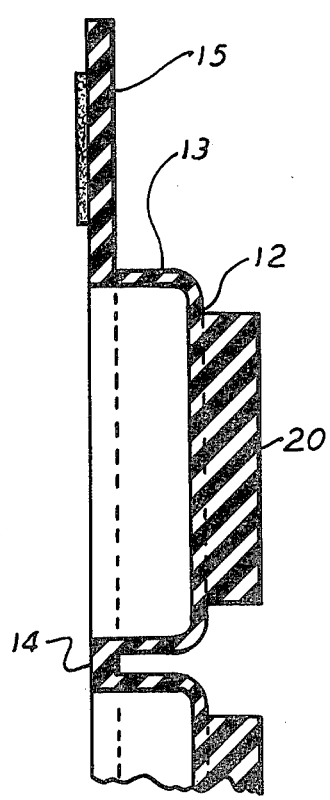
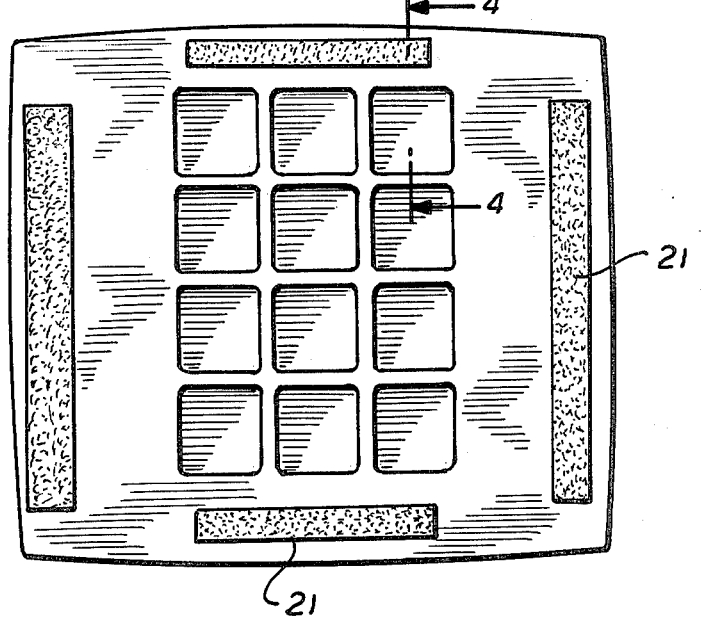

PROTECTIVE COVER FOR TELEPHONE PUSH BUTTON ARRAY

FIELD OF THE INVENTION

This invention relates generally to protective covering devices for use in connection with arrays of key-operated switches, and more specifically, relates to a cover of such character which is particularly adapted for use with a push button-type telephone set.

BACKGROUND OF THE INVENTION

Within recent years, telephone sets incorporating push-button arrays, commonly including twelve such push-buttons, have come into widespread use and have largely supplanted the previously common rotary dial-type telephone. The individual push-buttons comprising such a telephone set array normally project through the cover of the telephone, or a portion of the telephone cover. The remainder of the switching array is contained beneath this outer shell of the telephone set. In various environments, including especially industrial and commercial environments, but as well in the home, this telephone set which is usually conveniently placed with respect to a work station, is subject to damage from environmental hazards, including especially to spillage of liquids which can readily seep through the openings surrounding the individual push button keys and cause damage, in some cases irreparable damage, to the underlying switching device.

While several types of covering elements have been previously proposed for use in connection with push button-type telephones, these have not addressed the foregoing problem of providing a protective envelopment of the push button array to prevent damage, especially from liquids. For example, patents such as U.S. Pat. Nos. 3,739,105; 3,927,282; 4,002,855; and 3,345,769, have been concerned with a variety of problems including arrangements for facilitating dialing by varying spacing of the actuating means for the individual push-buttons, or in the case of U.S. Pat. No. 3,345,769, providing a means for supporting message pads or the like.

Of particular interest in connection with the present invention is the teaching in the aforementioned U.S. Pat. No. 3,739,105, that the push buttons on the covering device can be formed to provide a width of material which glows in the dark, thereby facilitating use of the telephone in darkened surroundings.

The problem of providing an adaptation enabling use of a push button telephone under darkened conditions, is indeed a problem which has been occasionally addressed, but never adequately met. Thus, it may be noted that numerous prior art devices extending back many years and directed toward a similar problem in a rotary dial telephone, have considered use of phosphorescent materials in some manner as to enable limited visible use under darkened conditions as in the mentioned U.S. Pat. No. 3,739,105.

Pursuant to the foregoing, it may be regarded as an object of the present invention to provide a simple, inexpensive to manufacture cover for use with a push button dial telephone or the like, which device acts to effectively seal the push button array against damage by liquids or other hazards, while at the same time providing no interference with use in actuation of the push buttons.

It is a further object of the present invention to provide a protective cover of the above character which may further include phosphorescent indicia to enable visibility under reduced light conditions.

SUMMARY OF INVENTION

In accordance with the invention, a covering element for a switching matrix, including an array of push-buttons arranged in rows and columns displaceable in a cover plate, for example a push-button array of a dial telephone set, comprises a flexible elastomeric sheet having pockets therein conforming to each of the buttons in the array and is adapted to overlie the coverplate and the buttons. Each of the pockets has a top portion and side walls which cover each button. The side walls of adjoining pockets are joined together by portions of the sheet so that a complete enclosure is formed over each of the buttons. In addition, the sheet has a skirt portion which extends in directions away from the push-button array and is continuous between the lateral edges for covering the entire push-button array and protecting it from spillage of liquids and the like since the cover is impervious to liquids.

While the sheet may consist of a transparent plastic material so that indicia on the buttons are visible therethrough, preferably, if the material is opaque, each of the pockets may be provided with readable indicia on the top portion corresponding to any indicia present on the underlying pushbuttons which are received in each of the pockets.

As a further feature of the invention, each of the indicia can be made of a phosphorescent material which is adapted to glow, or be visible, under low light level or darkened conditions, thus facilitating the use of the push-button array in a darkened environment.

The protective cover may be provided with adhesive strips on its underside which, prior to attachment to the switching matrix array, may be covered with paper which can be removed. This facilitates the attachment of the flexible cover over the push-button array.

To protect the push-button array, for example, on a pushbutton telephone set the sheet is simply placed over the button array and the buttons are covered by the individual pockets in the sheet. Thus, if any liquids which would adversely affect the telephone set are accidentally spilled, the set will not be affected thereby.

The invention will be described in more detail with reference to the drawing which forms part of this specification and preferred embodiments thereof, these embodiments being illustrative only.

BRIEF DESCRIPTION OF THE FIGURES OF THE DRAWINGS

The invention will be further described with reference to the drawings in which:

FIG. 1 is a top view of a first embodiment of a protective cover for a pushbutton telephone set;

FIG. 2 is a side view of the cover of FIG. 1;

FIG. 3 is another side view of the FIG. 1 device;

FIG. 4 is a side view of a single pocket of the array in FIG. 1;

FIG. 5 is a bottom view of the device of FIG. 1, showing the adhesive strips that are provided;

DESCRIPTION OF THE PREFERRED EMBODIMENT OF THE INVENTION

Figure 6:
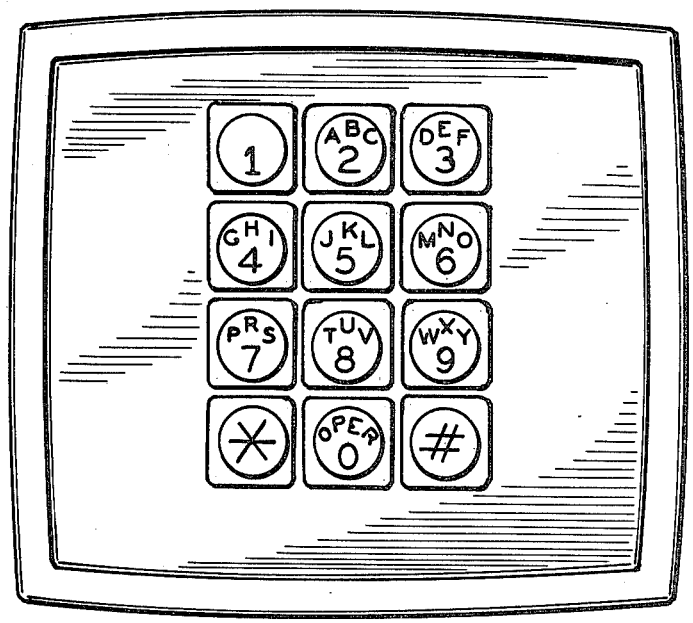
FIG. 6 is a top plan view of a second embodiment of a device in accordance with the invention.

While the invention is about to be described in connection with a preferred embodiment showing a protective cover for a push-button telephone subscriber set, it is to be understood that the protective cover about to be described is applicable to any type of switching matrix employing push-buttons arranged in columns and rows.

The cover is made of an elastomeric material such as rubber, or it may be made of a plastic material such as polyvinylchloride. This cover is designated 10. A number of pockets are provided in the cover, generally shown as 11. Each of these pockets has a top portion 12 and sidewall portion 13, which conform to the shape of the underlying pushbutton. Adjoining pockets are joined by the material of the cover as shown by 14 in FIG. 4; thus each of the buttons in the push-button array in a telephone set are adapted to fit into each of the pockets of the cover so that when the cover is placed over the telephone set all of the pushbuttons are covered.

The cover is provided with a skirt 15, which extends beyond the pushbutton array, the sheet itself being continuous between the lateral edges generally shown as 16, 17, 18 and 19. At the top of each of the pockets a raised portion or mesa 20 is provided which may be provided with an indicia corresponding to the indicia on the underlying button of the telephone set. Such indicia can be directly molded into mesa 20, or can be applied thereto, as by printing or so forth.

To facilitate attachment of the cover to the telephone set, the underside may be provided with adhesive strips 21, which initially are covered with paper which is removed before the strip is attached. These strips, it should be noted, are entirely optional and they may be omitted, if desired. They serve simply to secure the cover to the telephone set.

In a further aspect of the invention, the projecting portion 20 of the pocket can be coated with, or made of a phosphorescent material which can glow in a darkened environment if properly energized. For example, certain phosphors will glow for a limited time after exposure to ambient light or may be caused to glow by exposure to ultraviolet radiation. In some cases phosphers can be used which will glow in response to a radio frequency field. The means for producing phosphorescence in such cases is so well known that no showing of such means is indicated in the drawing.

The protective cover 10 may be colored to match the telephone set if desired.

Figure 7:
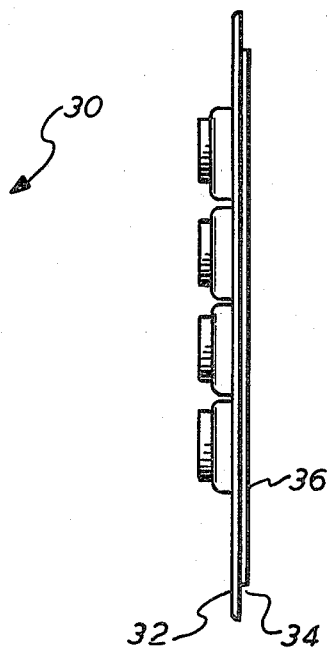
FIG. 7 is a side view of the device of FIG. 6.
Figure 8:
FIG. 8 is a further side elevational view of the device of FIG. 6.
Figure 9:
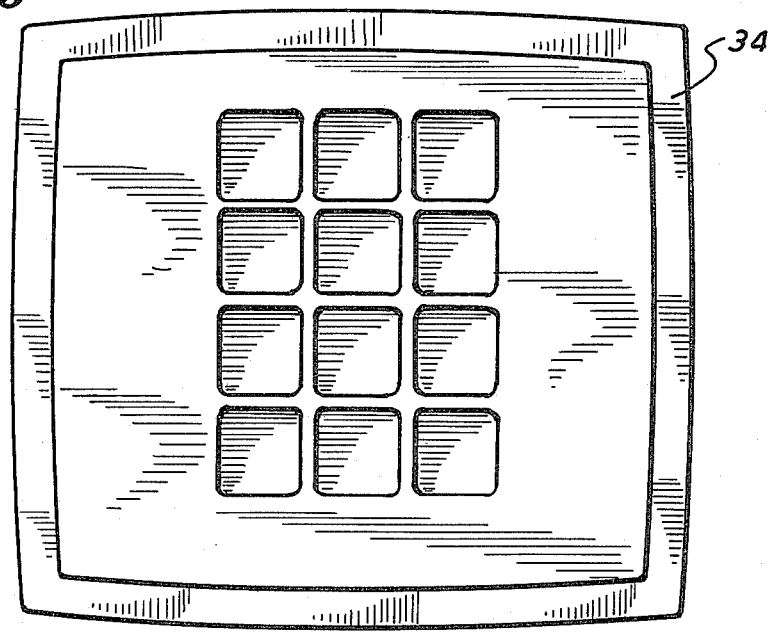
FIG. 9 is a bottom view of the device of FIG. 6.

In FIGS. 6 through 9, a second embodiment of a protective cover in accordance with the invention appears. The cover 30 shown therein is in most respects similar to the embodiment of the device depicted in FIGS. 1 through 5, and corresponding elements are identified by corresponding reference numerals. The distinction between the two embodiments is that cover 30 is provided with a bordering portion 32, the lower surface 34 of which is recessed with respect to the remaining lower surface 36 of cover 30. In this embodiment, instead of using adhesive strips 21 as in the prior embodiment, the recessed surface 34 is initially free of any adhesive. In using device 10, one applies to the recessed surface 34 (or to portions of surface 36 or to the telephone face to which the device is to be affixed), a small quantity of adhesive, which preferably can be a material such as a rubber cement (which does not permanently bond and can therefore be removed without damage), and then applies moderate pressure between the cover 30 and the telephone face to effect adherence between the two.

It is to be understood, of course, that the cover of the invention may be used with other types of equipment than telephone sets of the push-button type, wherever the problem arises of a push-button array which activates a switching matrix and in which the push-buttons are accessible through a cover element to which liquids may seep. Accordingly, it is to be understood that the invention is not to be limited to covers for telephone handsets.

Having thus described the invention, other modifications will be apparent to those skilled in the art without departing from the spirit and scope of the invention as described in the claims.

What is claimed is:

1. A protective cover for the push-button array of a push-button telephone set, comprising:
   a flexible elastomeric sheet having a grid of upwardly-directed pockets, each of said pockets being defined by substantially vertical side-walls rising above the main plane of said sheet and an upper top portion extending across the tops of said vertical walls, the adjacent vertical walls of adjacent pockets being spaced from each other; said pockets thereby extending above the said plane of said sheet and being open at the lower end for snugly receiving each of the buttons of said array and thereby overlying the corresponding array of push-buttons on said telephone; said top portion of each said pocket being provided with an upwardly protruding portion, the lateral periphery of which is inward of said vertical walls; said pockets being elastically depressible independently of one another toward their open ends, to permit individual displacement of the underlying telephone set push-buttons received in said pockets; said sheet including a skirt portion extending laterally beyond said grid and said sheet being continuous between its lateral edges, whereby said entire push-button array is overlaid by said cover and thereby protected from spillage of liquids or other environmental hazards.

2. A device in accordance with claim 1, wherein the outwardly facing parts of said pocket portions carry readable indicia thereupon corresponding to the indicia present on the underlying telephone push buttons received therein.

3. A device in accordance with claim 2, wherein the indicia provided on said pocket portions are defined by phosphorescent material.

4. A device in accordance with claim 2, wherein the downwardly facing surface of said skirt-like portion carries pressure sensitive adhesive portions, to enable securing of said device to the face of apparatus carrying the said array of key-operated switches.

5. A protective cover as claimed in claim 1, wherein the flexible elastomeric sheet is transparent whereby indicia on the push buttons are visible through the sheet.

6. A protective cover as claimed in claim 1, wherein said pockets are rectangular.

* * * * *